(12) United States Patent
Tuncer et al.

(10) Patent No.: US 7,458,049 B1
(45) Date of Patent: Nov. 25, 2008

(54) AGGREGATE SENSITIVITY FOR STATISTICAL STATIC TIMING ANALYSIS

(75) Inventors: Emre Tuncer, Santa Cruz, CA (US);
Alessandra Nardi, Hayward, CA (US);
Srinath R. Naidu, Bangalore (IN);
Aliaksandr Antonau, Sunnyvale, CA (US)

(73) Assignee: Magma Design Automation, Inc., San Jose, CA (US)

( * ) Notice: Subject to any disclaimer, the term of this patent is extended or adjusted under 35 U.S.C. 154(b) by 44 days.

(21) Appl. No.: 11/451,905

(22) Filed: Jun. 12, 2006

(51) Int. Cl.
*G06F 17/50* (2006.01)
*G06F 9/45* (2006.01)

(52) U.S. Cl. .............. 716/6; 716/1; 716/2; 716/5; 703/2; 703/13; 703/14

(58) Field of Classification Search ............ 716/1–2, 716/5–6; 703/2, 13, 14
See application file for complete search history.

(56) References Cited

U.S. PATENT DOCUMENTS 7,293,248 B2 * 11/2007 Chang et al. ............. 716/6

2006/0059446 A1 * 3/2006 Chen et al. ............. 716/6

OTHER PUBLICATIONS

Jess, J.A.G. et al., "Statistical Timing for Parametric Yield Prediction of Digital Integrated Circuits," Design Automation Conference, Anaheim, CA, 2003, pp. 932-937.

Naidu, S.R., "Tuning for Yield—Towards Predictable Deep-Submicron Manufacturing," Ph.D. Thesis, Department of Electrical Engineering, Eindhoven University of Technology, The Netherlands, Jul. 13, 2004, 197 pages.

* cited by examiner

*Primary Examiner*—Jack Chiang
*Assistant Examiner*—Nghia M Doan
(74) *Attorney, Agent, or Firm*—Townsend & Townsend & Crew LLP

(57) ABSTRACT

A system and a method are disclosed for circuit analysis. A circuit modeling system calculates sensitivities of gates for statistical static timing analysis of a circuit. Timing distribution sensitivities of gates and correlations between the sensitivities are determined. A Monte Carlo simulation is run using the sensitivities to determine timing distribution of paths and determine probabilities of paths being the critical path. Aggregate sensitivities for cells are also determined.

12 Claims, 14 Drawing Sheets grid A: $L_{eff}$: 2 x 2
grid B: $T_{ox}$: 4 x 4

| Start | End | Edge | Mean | Std. Dev | Criticality |
|---|---|---|---|---|---|
| i2 | o | FF | -160 | 15.0 | 51.300 |
| i1 | o | FF | -160 | 15.0 | 48.700 |
| i2 | o | RR | -160 | 15.0 | 0.000 |
| i1 | o | RR | -160 | 15.0 | 0.000 |
| i3 | o | FF | -20 | 20.6 | 0.000 |
| i3 | o | RR | -20 | 20.6 | 0.000 |

FIGURE 13

| Cell | Agg. Sens. | Agg. Crit. | Slack | Max Sens. |
|------|------------|------------|--------|-----------|
| G4 | 10.0 | 100.0 | -160.0 | 10.0 |
| G2 | 5.1 | 51.3 | -160.0 | 10.0 |
| G5 | 5.0 | 100.0 | -160.0 | 5.0 |
| G1 | 4.9 | 48.7 | -160.0 | 10.0 |
| G3 | 0.0 | 0.0 | -20.0 | 20.0 |

FIGURE 14

AGGREGATE SENSITIVITY FOR STATISTICAL STATIC TIMING ANALYSIS

CROSS REFERENCE TO RELATED APPLICATIONS

This application is related to U.S. patent application Ser. No. 11/451,705, filed Jun. 12, 2006, and titled "Filtering Methods for Statistical Timing Analysis," the contents of which are hereby incorporated by reference.

BACKGROUND

1. Field of Art

The present invention generally relates to the field of electronic design automation, and more specifically, to electronic design automation using statistical static timing analysis.

2. Description of the Related Art

Electronic design automation (EDA) is used extensively in the design of integrated circuits. An electronic circuit under design is evaluated using models of devices and interconnections between the devices. A simulation using these models is then run to test the performance of the circuit.

Statistical static timing analysis (SSTA) is a methodology of electronic design automation for verifying whether the circuit under design meets desired timing criteria using statistical properties of the propagation delays. The probability distributions of the delays increase the complexity and the numbers of calculations run for SSTA.

From the above, there is a need for a system and process to provide an EDA model that reduces the numbers of calculations that are run for the statistical static timing analysis.

SUMMARY

One embodiment of a disclosed system and method includes a method of determining timing characteristics of an electrical element. Sensitivity of the electrical element is determined. Criticality of paths to the electrical element is determined. An aggregate sensitivity of the electrical element is calculated. The aggregate sensitivity may be calculated by multiplying the element sensitivity and the sum of the criticalities of the paths.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 13 is a table illustrating statistical timing of the exemplary circuit of FIG. 12.

FIG. 14 is a table illustrating aggregate sensitivity for the exemplary circuit of FIG. 12.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, the disclosed embodiments describe a system and method for analyzing timing characteristics of a circuit under design by calculating sensitivities of elements and applying statistical analysis for path selection.

Figure 1:
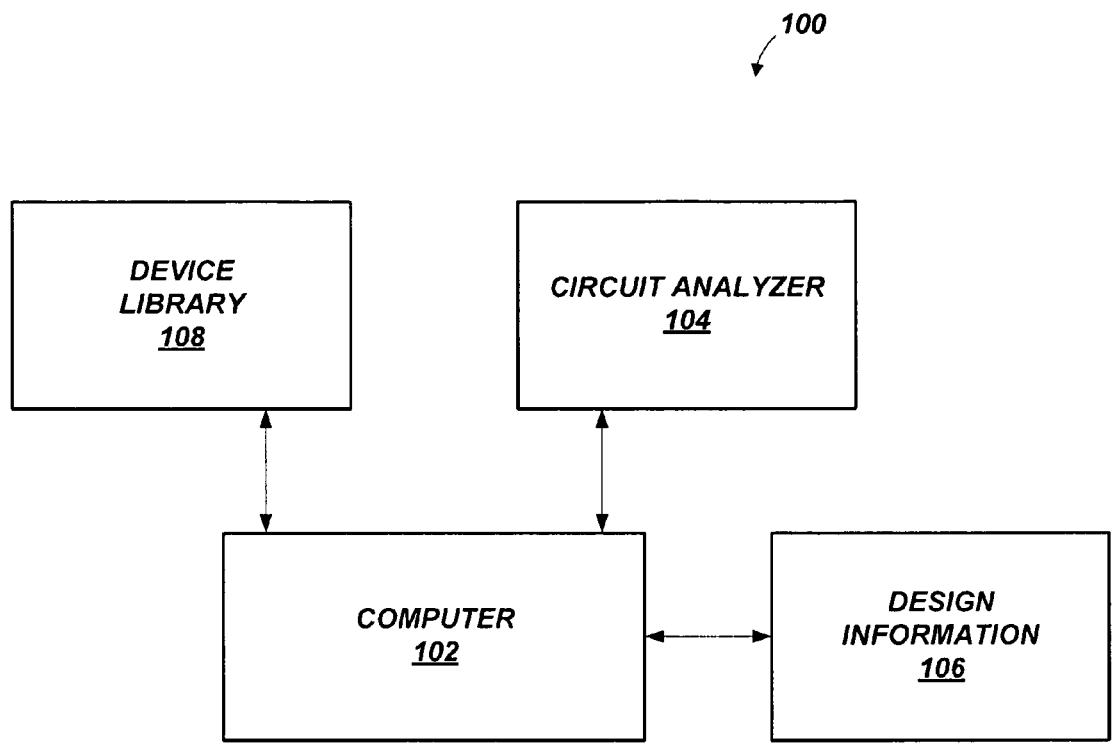
FIG. 1 is a block diagram illustrating an electronic design automation system.

FIG. 1 is a block diagram illustrating an electronic design automation system 100. A computer 102 executes a circuit analyzer 104 for generating device models for circuits stored in a device library 108 and for simulating the operation and performance of an electrical circuit under design. The computer 102 receives design information 106, such as a net list, corresponding to the electrical circuit under design. The computer 102 retrieves corresponding models from the device library 108, and executes a design simulation using the circuit analyzer 104. The circuit analyzer 104, the design information 106, and, the device library 108 may reside in a memory internal or external to the computer 102.

The circuit analyzer 104 generates a model for a cell indicative of the timing characteristics of the cell including sensitivity of the cell to process parameters for the design and manufacturing of a device embodying the circuit. The model typically includes probability distributions of timing of the cell for global and local variations. The local variations may include systematic variations and random variations.

Figure 2:
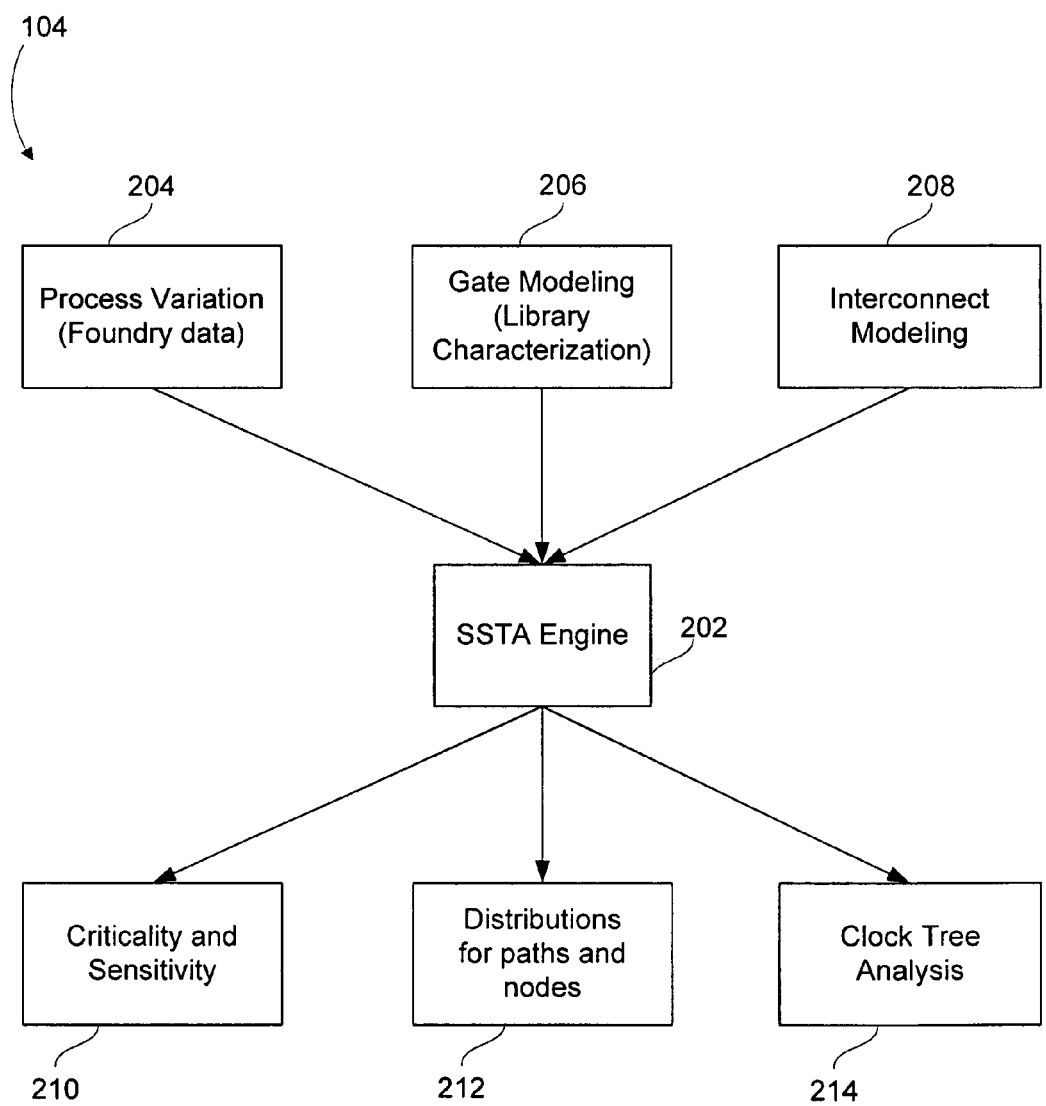
FIG. 2 is a block diagram illustrating a circuit analyzer of the electronic design automation system of FIG. 1.

FIG. 2 is a block diagram illustrating the circuit analyzer 104.

The circuit analyzer 104 comprises a statistical state timing analysis (SSTA) engine 202 that receives process variation data 204 provided from a foundry and representing the process parameters to be considered as statistical rather than deterministic to describe the process variations. Process variation can affect device parameters and interconnect dimensions, such as width, thickness, and interlayer dielectric thicknesses. The process variation data may be presented in the form of a Statistical Spice model. Process variations may be categorized as global and local: Global variations include die-to-die, wafer-to-wafer and lot-to-lot variations, while within-die variations are referred to as local variations. Additionally, for local variations, different parameters have different behavior. For example oxide thickness mostly has systematic variation, while the number of dopants may have random behavior. Both global and local (including systematic and random) variations are modeled and handled by the SSTA engine 202.

The SSTA engine 202 uses gate modeling data 206 and interconnect modeling data 208 from the device library 108. The data 206 and 208 include sensitivity information of design components (e.g., devices and interconnects) to process variations.

The SSTA engine 202 may perform the SSTA using a variety of well-known approaches including path based and block based approaches. For all the approaches, the SSTA engine 202 processes correlations, Gaussian distribution assumptions, statistical min/max operations, slew/capacitance variation effects and environmental variations as described herein.

The output of the SSTA engine 202 includes criticality and sensitivity data 210, delay/slack probability density functions data 212, and clock tree analysis data 214 for all design components (paths, nodes) and the circuit under design itself. The data 210, 212 and 214 facilitates estimating the design parametric yield and enabling performance/yield trade-off during circuit design. Statistical analysis results can help tighten on-chip variation (OCV) margins used in deterministic analysis and optimization per design basis. The SSTA engine 202 evaluates the criticality of paths statistically or deterministically or both. The path criticality can be combined with delay sensitivity to help determine variability bottlenecks in designs and drive statistical optimization.

The SSTA engine 202 performs statistical static timing analysis that evaluates correlations and propagation of distribution under min/max operations. The delay/slack correlation may be due to correlation between process parameters, or due to path sharing in static timing analysis.

Figure 3:
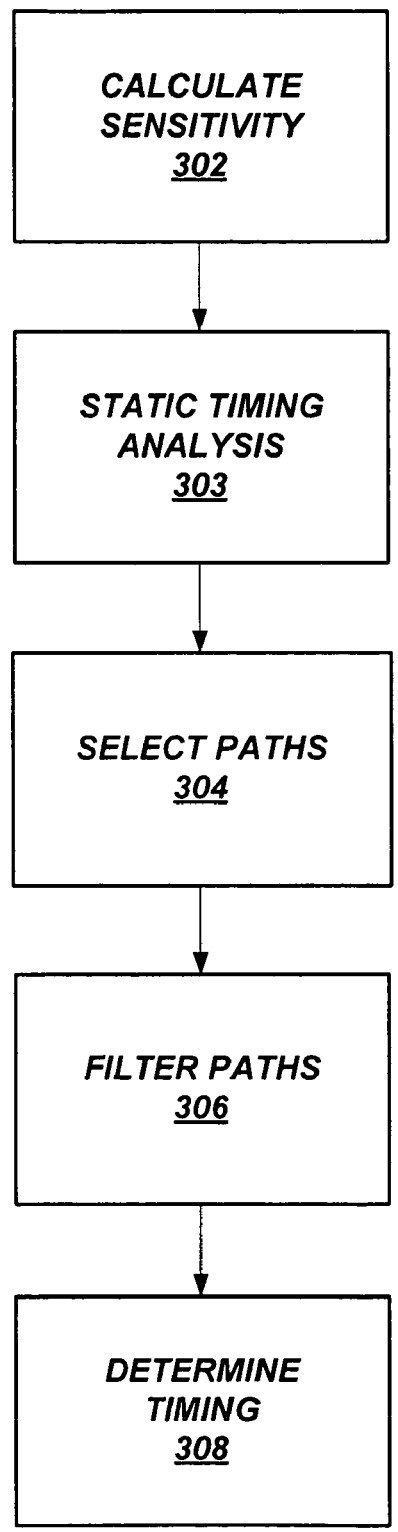
FIG. 3 is a flow chart illustrating a first methodology for analyzing timing of a circuit under design.
Figure 4:
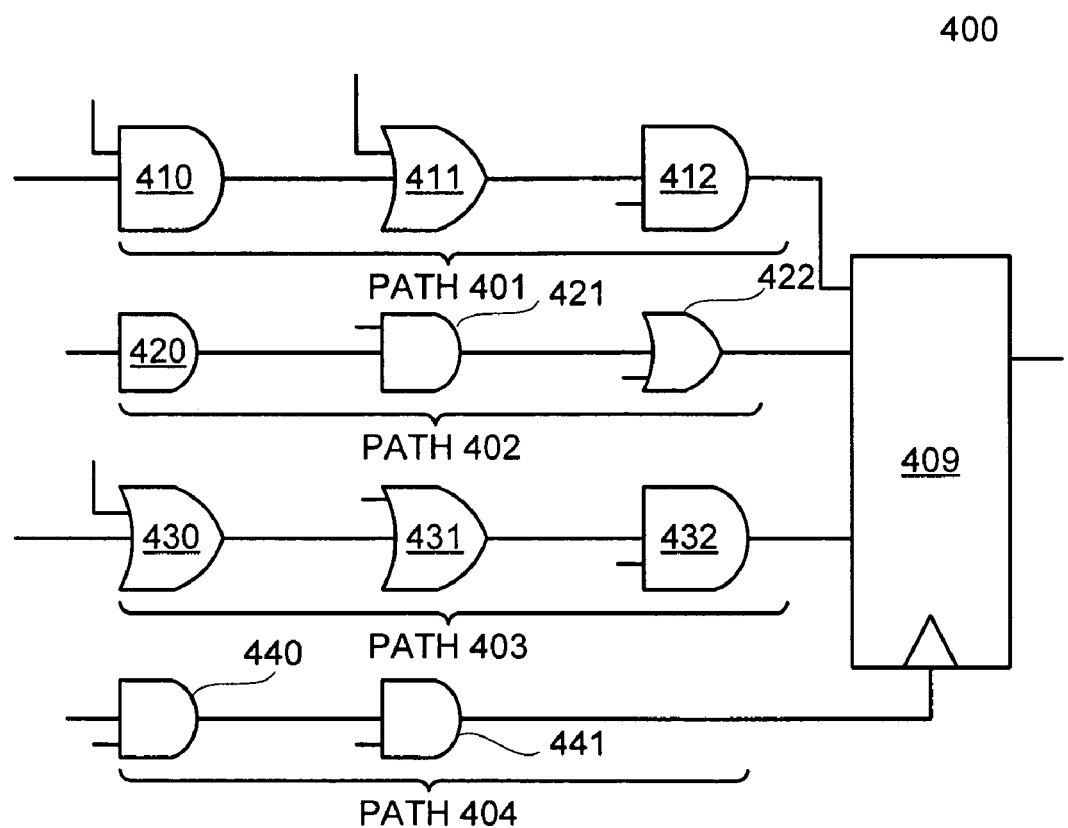
FIG. 4 is a schematic diagram illustrating an exemplary circuit under design.

FIG. 3 is a flow chart illustrating a first methodology for analyzing timing of a circuit. FIG. 4 is a schematic diagram illustrating an exemplary circuit 400 under design used to illustrate the methodology of FIG. 3. The circuit 400 is one example of a circuit under test and includes AND gates and OR gates, but other circuit elements may be used.

The circuit analyzer 104 calculates the sensitivity of the cells in the circuit (block 302). The sensitivity may include systematic variations caused by inter-die variability, such as lot to lot variations with a fabrication facility, wafer to wafer variation with a lot, and die to die variation within a wafer. The sensitivity may include local variations caused by intra-die variability, such as device to device variation with a die. In one embodiment, the sensitivity includes the delay of the cell. The delay may be calculated as a nominal delay plus the sum of probability distributions of parameters causing global and local variations. For example, the circuit analyzer 104 generates a model of the sensitivity of a plurality of AND gates 410, 412, 420, 421, 432, 440 and 441, a plurality of OR gates 411, 422, 430 and 431 and a register 409 of the circuit 400. The circuit analyzer 104 performs a static timing analysis of the circuit (block 303). This analysis includes timing characteristic of signal paths in the circuit based on numerical delay times, minimum setup and maximum hold times to determine criticality of the path. The circuit analyzer 104 selects paths to a cell for analysis based on criticality of the paths (block 304). The criticality of the path includes the probability distribution for negative slack, which indicates that the path does not have sufficient time for the circuit operation. For example, the circuit analyzer 104 selects paths 401, 402, and 403 to the register 409. The first path 401 comprises the AND gates 410 and 412 and the OR gate 411. The second path 402 comprises the AND gates 420 and 421 and the OR gate 422. The third path 403 comprises the OR gates 430 and 431 and the AND gate 432. A path 404 is a path of a clock signal and comprises the AND gates 440 and 441.

The circuit analyzer 104 filters paths based on the probability distribution functions of the paths, such as shown in FIG. 3 (block 306).

Figure 5:
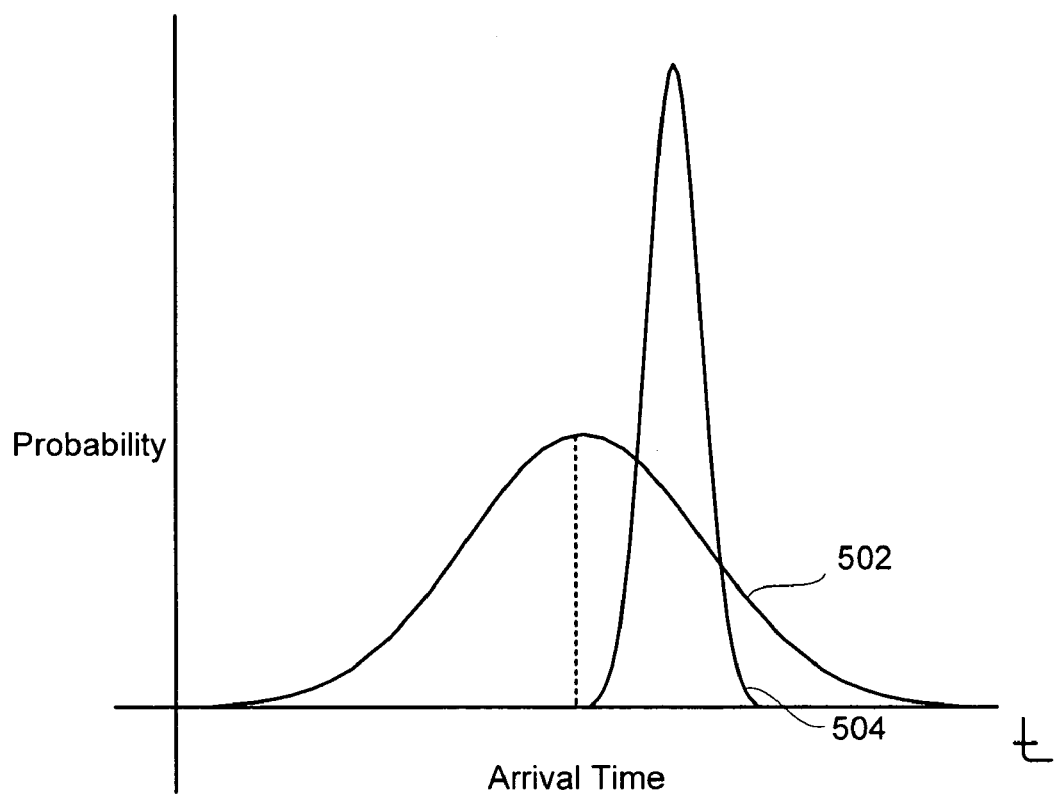
FIG. 5 is a graph illustrating delay distributions of elements of the circuit of FIG. 4.

FIG. 5 is a graph illustrating delay distributions of elements of the circuit of FIG. 4. The line 502 illustrates the probability distribution function of arrival time due to global variations. A line 504 illustrates the probability distribution function of arrival time due to local variations.

Referring again to FIG. 3, in one embodiment, the circuit analyzer 104 filters paths among the selected paths that do not affect a final slack distribution of the circuit. The filtering may include removing a path that has a probability distribution with a left three sigma point that is to the right of the right three sigma point of the probability distribution of another path, such as described below for removing a line 1003 of the path 403 in FIG. 10.

Figure 10:
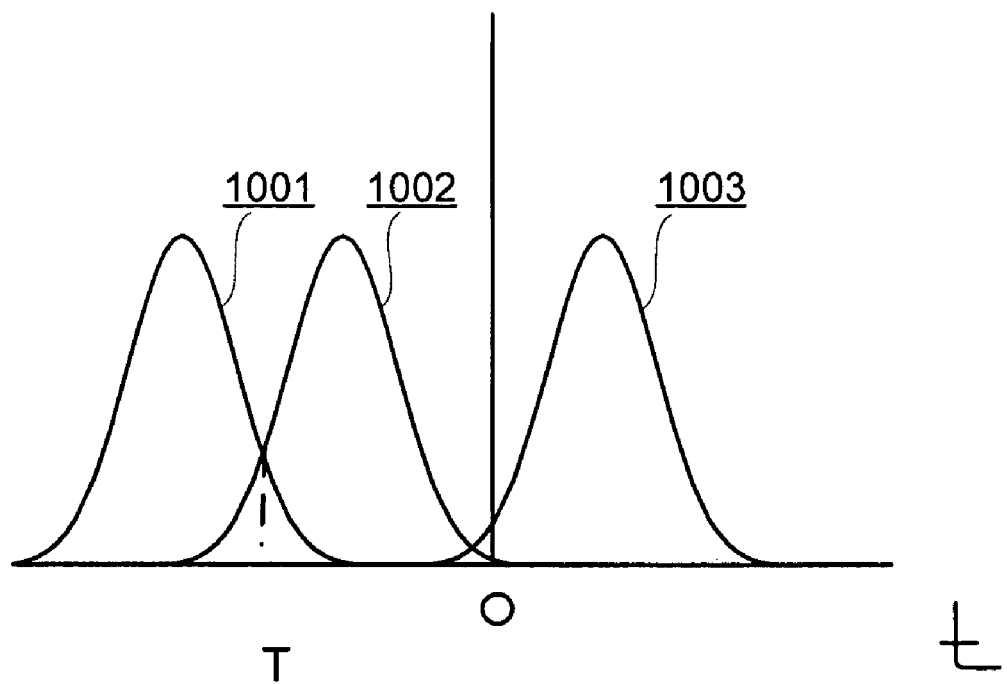
FIG. 10 is a graph illustrating delay distributions of paths of the circuit under design of FIG. 4.

FIG. 10 is a graph illustrating delay distributions of paths of the circuit 300 under design. Lines 1001, 1002, and 1003 represent probability distribution functions (PDF) of the paths, e.g., paths 401, 402, and 403, respectively. Because the probability distribution functions represented by the line 1001 dominates the probability distribution functions represented by the line 1003, the circuit analyzer 104 removes the path 403 represented by the line 1003 from further analysis of the timing. The circuit analyzer 104 determines timing of the filtered paths of the circuit under design (block 306). The path 402 has a higher probability of slack time above a time T than the path 401 as shown by lines 1002, and 1001, respectively. The circuit analyzer 104 adjusts the timing analysis to include the probabilities of the different paths being the critical path based on the overlap of the probability functions.

Although three sigma points are described, other points of the probability functions may be used. In one embodiment, the "worst case point" of the probability function of the removed path is greater than the "best case point" of the probability function of one of the other paths to the same register. The worst and best case points of the probability functions may be based on threshold probabilities. The filtering of the paths includes using probability distributions of the timing of the path. The filtering of the paths from the selected paths may include removing from the timing analysis all filtered paths that are statistically dominated by any of the selected paths.

Referring again to FIG. 3, the circuit analyzer 104 may also remove paths based on correlations between paths such as described below in conjunction with FIGS. 6-9. The circuit analyzer 104 determines the statistical timing of the paths using the calculated sensitivities of the elements of the paths (block 308). The circuit analyzer 104 typically runs a simulation, such as a Monte Carlo simulation, on the model of the circuit under test.

Figure 6:
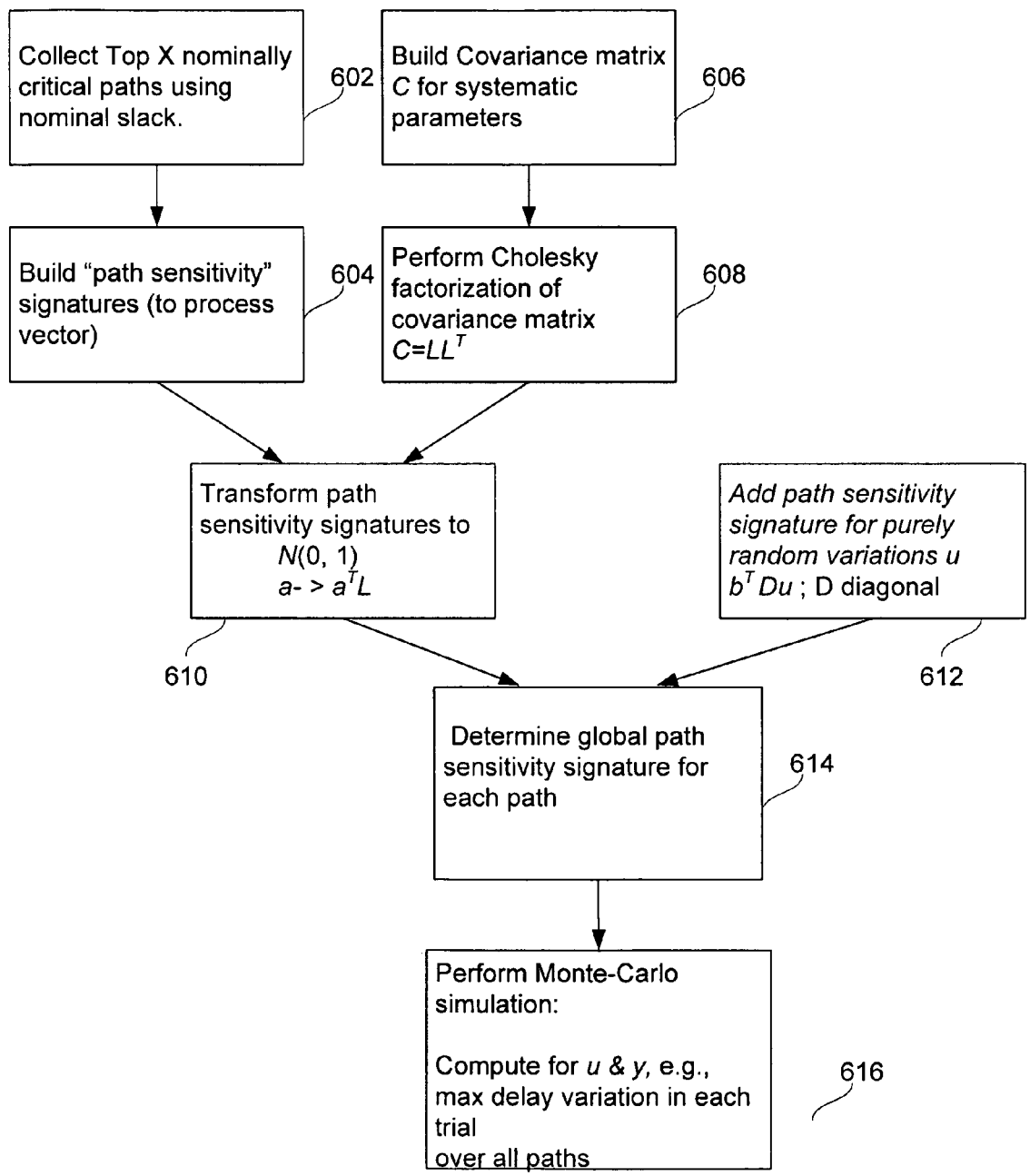
FIG. 6 is a flow chart illustrating a second methodology for analyzing a circuit under test using path sensitivity.

FIG. 6 is a flow chart illustrating a second methodology for analyzing a circuit under test using path sensitivity.

The circuit analyzer 104 collects a predetermined number of the top nominally critical paths using nominal slack (block 602) and builds path sensitivity signatures to form a vector a, which is a path sensitivity vector corresponding to systematic variations (block 604). The circuit analyzer 104 builds a covariance matrix C for systematic process parameters (block 606). The covariance matrix C may have non-zero off-diagonal elements. The circuit analyzer 104 performs Cholesky factorization of the covariance matrix C using $$C = LL^T \qquad (1)$$

to determine the matrix L, which is the Cholesky root of the covariance matrix C (block 608). The matrix $L^T$ is the transpose of the Cholesky root L. The circuit analyzer 104 transforms the vector a of path sensitivity signatures to form a vector $a^T L$ using the Cholesky root matrix L for a normalization process using a Gaussian random variable N(0,1) of zero mean and unit variance (block 610).

The circuit analyzer 104 generates a path sensitivity signature for purely random variations u in the paths for a vector form $b^T Du$, in which b is a path sensitivity vector corresponding to random variations (block 612). The matrix D is a diagonal covariance matrix corresponding to purely random variations, which are by definition independent of each other. In one embodiment, the matrix D has no non-zero off-diagonal elements. The vector u is a vector of N(0,1) variables. Using the transformed path sensitivity vector a and the path sensitivity signature, the circuit analyzer 104 determines a global path sensitivity signature for each path (block 614). The global path sensitivity signature of path i is given by $$a_i^T L + b_i^T D \qquad (2)$$

The circuit analyzer 104 performs a Monte-Carlo simulation on the paths by sampling the systematic and random variations to determine the maximum delay variation in each sample over all paths (block 616). For each sample y and u, the circuit analyzer 104 computes the maximum global sensitivity using $$\max(a_i^T L + b_i^T D) \qquad (3)$$

where y=Lu and is a vector of systematic variations, and thus $a^T y = a^T Lu$, and is the transpose of the a vector for the ith path. The vector $a^T y$ provides the change in delay of a path with respect to systematic variations. The vector a is transformed to the vector $a^T L$. During the Monte Carlo simulation (block 616), the vector u is sampled by drawing independent samples from the N(0,1) distribution.

Figure 7:
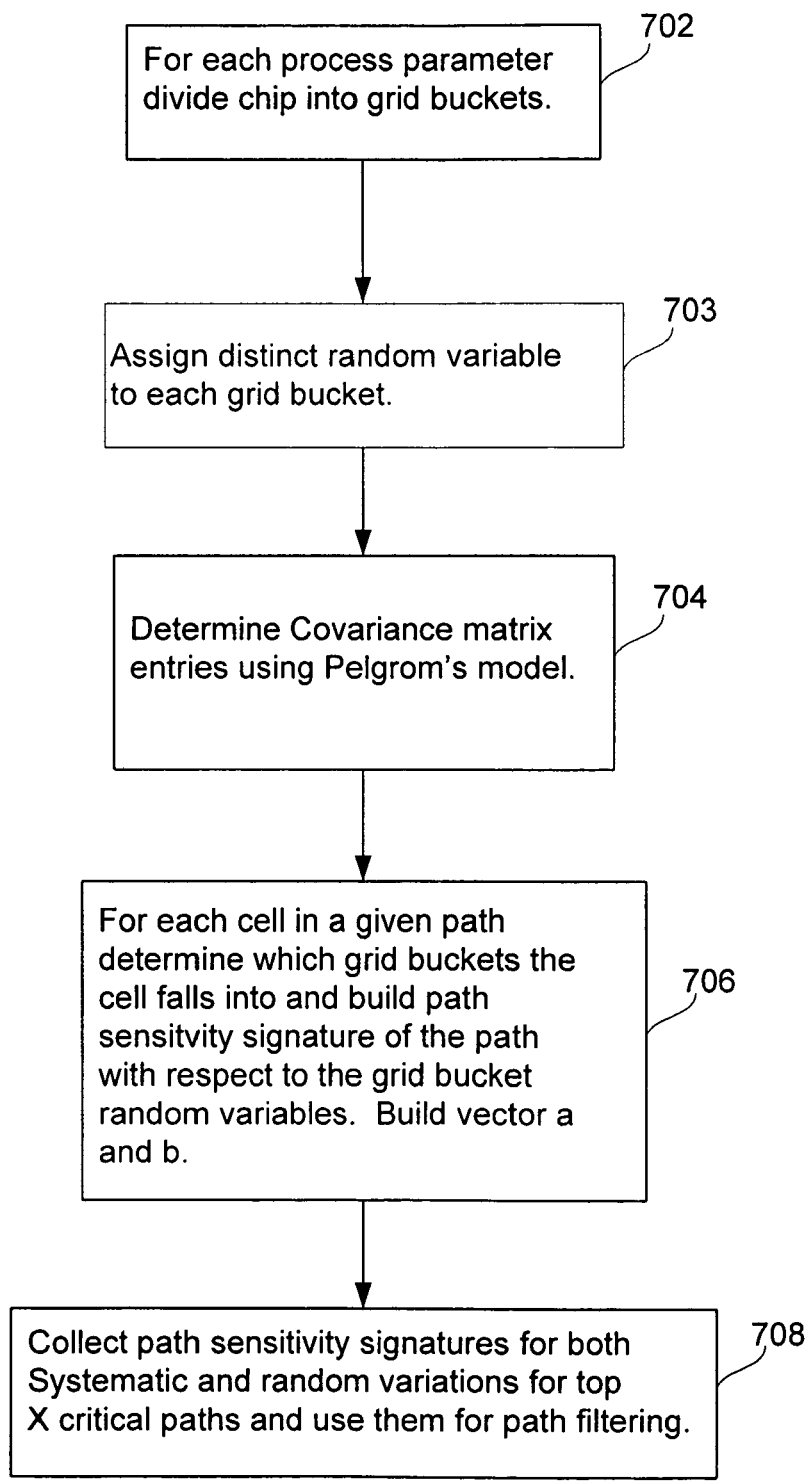
FIG. 7 is a flow chart illustrating a methodology for determining path sensitivity in the methodology of FIG. 6.

FIG. 7 is a flow chart illustrating a methodology for determining path sensitivity in the methodology of FIG. 6.

For each process parameter, the circuit analyzer 104 divides the chip into grid buckets (block 702) and assigns distinct random variables to each grid bucket (block 703). For an N×N grid, there are $N^2$ random variables. The circuit analyzer 104 determines a covariance matrix (block 704). Each process parameter grid of size N by N contributes an $N^2 \times N^2$ block to the covariance matrix.

For each cell in a given path, the circuit analyzer 104 determines which grid buckets the cell falls into and builds a path sensitivity signature of the path with respect to the grid bucket random variables (block 706). As the path is traced, the circuit analyzer 104 sums the sensitivities of different cells to the same random variables to build vector a, and sums the sensitivities with respect to random variations to build vector b. For random variations, grid bucket information need not be used. There is one random variable per cell for each process parameter.

The circuit analyzer 104 collects path sensitivity signatures for both systematic and random variations for a predetermined number of critical paths (e.g., the top X critical paths) and uses them for path filtering (block 708). The circuit analyzer 104 performs SSTA filtering using the determined correlation coefficients.

Figure 8:
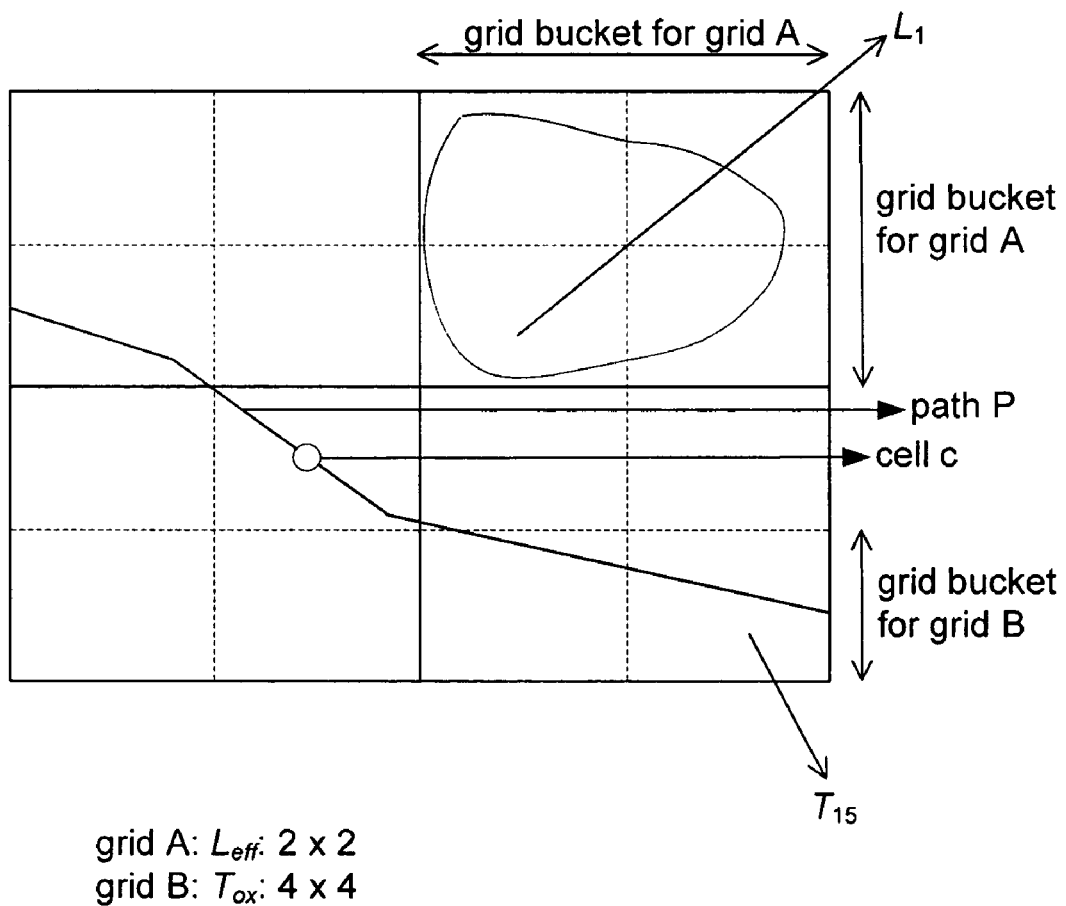
FIG. 8 is a diagram illustrating multiple grids on a die for the methodology of FIG. 7.

FIG. 8 is a diagram illustrating multiple grids on a die for the methodology of FIG. 6.

Two grids A and B are over laid on the same die area. The bottom grid (grid A) corresponds to the effective length $L_{eff}$. The top grid (grid B) corresponds to the oxide thickness $T_{ox}$. Consider a cell located in a third grid bucket of grid A. A cell C is located in the third grid bucket of grid A and the tenth grid bucket of grid B. This cell is affected by a length variation given by $L_2$ and a thickness of oxide variation of $T_9$. Then the delay of the cell is as follows:

$$d_{cell} = s_L(L_2) + s_T(T_9) \qquad (4)$$

In equation (4), $s_L$ is the sensitivity of the cell to $L_{eff}$ and $s_T$ is the sensitivity of the cell to $T_{ox}$. A path that passes through many cells has a delay equation similar to the equation (4) outlined above for cells.

How to populate a covariance matrix inspired by Pelgrom's model is described. Pelgrom's model states that the mismatch between a parameter measured for two identical transistors separated by a distance D is given by $$E((\Delta P)^2) = \frac{A^2}{WL} + S^2 D^2 \qquad (5)$$

Consider two gates, one in grid bucket i of A, and the other in bucket j of A. Assume that the locations of the two gates can be taken to be the centers of the respective grid buckets in which they are located. Let $D_{ij}$ denote the distance between the centers of the grid buckets i and j. Then a Pelgrom-like equation for the mismatch in $L_{eff}$ values measured at the two gates can be written as $$E((L_i - L_j)^2) = \frac{A^2}{WL} + S^2 D_{ij}^2 \qquad (6)$$

Taking $E(L_i^2)=E(L_j^2)=\sigma_i^2$, it follows:

$$E(L_i L_j) = \sigma_L^2 - 0.5 * \left(\frac{A^2}{WL} + S^2 D_{ij}^2\right) \quad (7)$$

Noting that $L_i$ and $L_j$ are variations, so $E(L_i)=E(L_j)=0$, and thus the covariance is $$Cov(L_i, L_j) = E(L_i L_j) - E(L_i)E(L_j) \quad (8)$$
$$= E(L_i L_j)$$

Finally we show the covariance matrix format for the two parameters $L_{eff}$ and $T_{ox}$ with grid sizes 2×2 and 4×4 respectively.

Figure 9:
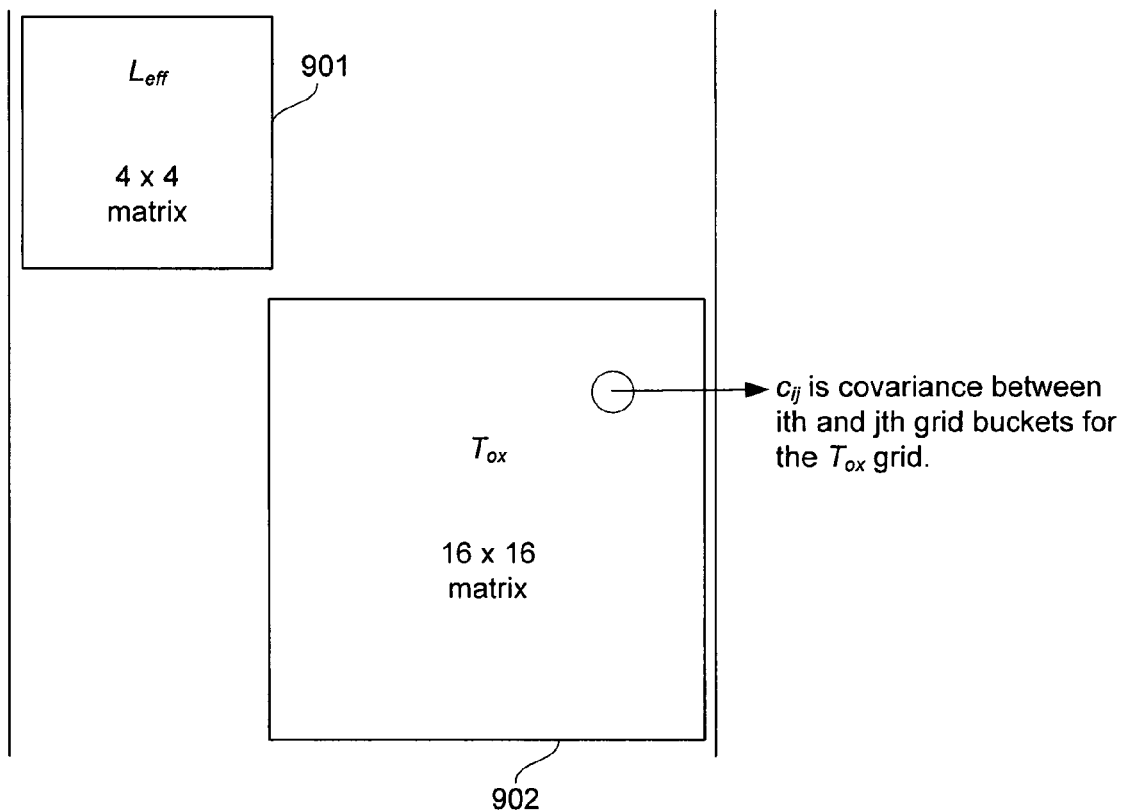
FIG. 9 is a diagram illustrating a single covariance matrix for grids on a die for the methodology of FIG. 7.

FIG. 9 is a diagram illustrating a single covariance matrix for grids on a die for the methodology of FIG. 6. The covariance coefficients determined from equation (8) form a covariance matrix with regions 901 and 902. The first region 901 is a 4×4 covariance matrix for $L_{eff}$. The second region 902 is a 16×16 matrix for $T_{ox}$. An entry $c_{ij}$ is the covariance between the i and j grid buckets for the $T_{ox}$ grid.

Figure 11:
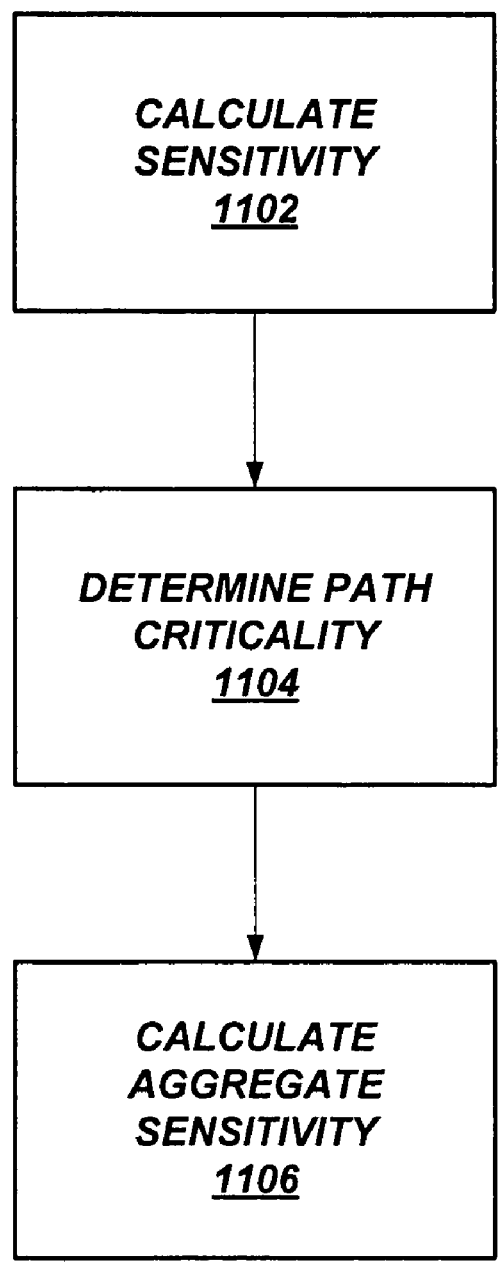
FIG. 11 is a flow chart illustrating a methodology for calculating aggregate sensitivity of a circuit element.

FIG. 11 is a flow chart illustrating a methodology for calculating aggregate sensitivity of a circuit element. The circuit analyzer 104 determines the sensitivity of a circuit element of a circuit under test (block 1102). For example, the arc sensitivity $C_i$ may be calculated by:

$$C_i = \frac{\partial D}{\partial P_i} \quad (9)$$

where D is the arc delay and $P_i$ is the $i^{th}$ process parameter. Process parameters typically include temperature, process, and voltage.

The circuit analyzer 104 determines path criticality for all paths of inputs to the circuit element (block 1104). The circuit analyzer 104 calculates an aggregate sensitivity of the electrical element from the cell sensitivities, the standard deviation of process parameters and the paths criticalities (block 1106). The aggregate sensitivity is the sum of the products of the arc sensitivities and the paths criticalities. For example, the aggregate sensitivity $A_G$ for gate G is $$A_G = \sum_{k=1}^{N} \pi_k \gamma_k \quad (10)$$

where N is the number of paths through gate G, $\pi_k$ is the criticality of path k and the arc sensitivity $\gamma_k$ of gate G for path k is calculated as:

$$\gamma_k = \sqrt{\sum_{i=1}^{M} C_i^2 \sigma_i^2 + 2 \cdot \sum_{i=1}^{M} \sum_{j=i+1}^{M} \rho_{ij} C_i C_j \sigma_i \sigma_j} \quad (11)$$

where M is the number of process parameters, $C_i$ is the sensitivity of arc k to process parameter i (as defined in (9)), $\rho_{ij}$ is the correlation between parameter i and parameter j and $\sigma_i$ is the standard deviation of process parameter i.

Figure 12:
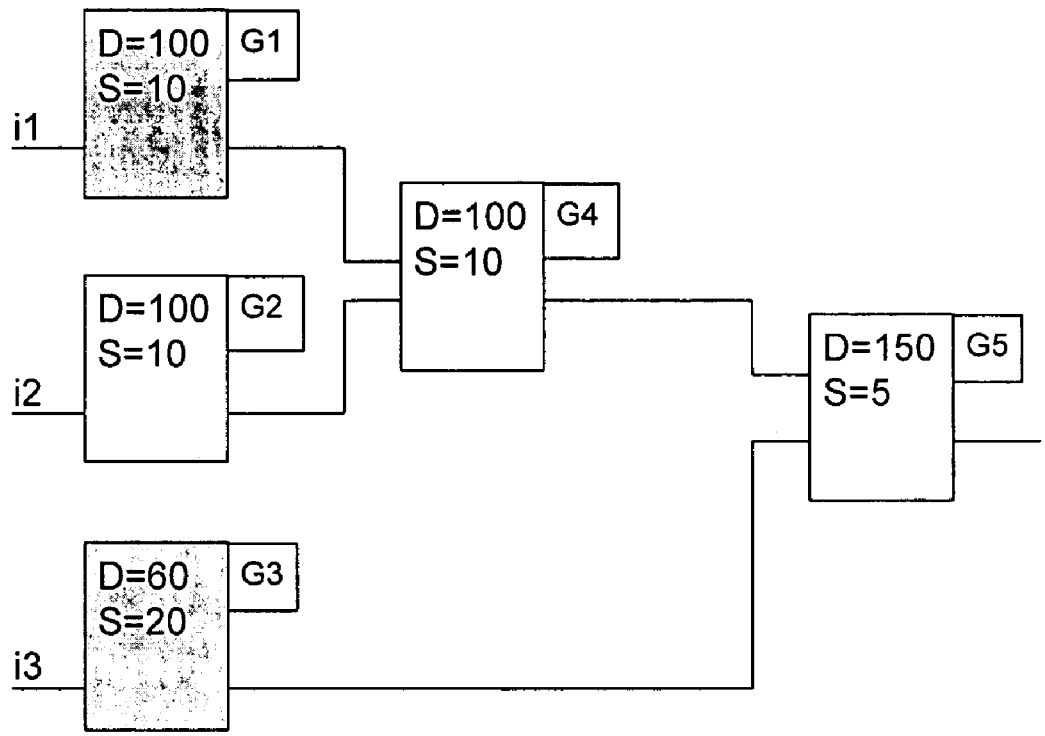
FIG. 12 is an exemplary circuit illustrating the aggregate sensitivity of FIG. 11.

FIG. 12 is an exemplary circuit illustrating the aggregate sensitivity of FIG. 11. FIG. 13 is a table illustrating statistical timing of the exemplary circuit of FIG. 12. FIG. 14 is a table illustrating aggregate sensitivity for the exemplary circuit of FIG. 12.

Both criticality and sensitivity are taken into account when performing statistical optimization. One goal of statistical optimization is to improve the probability that the overall circuit slack is positive. FIGS. 12-14 provide simple example to show how the notion of criticality and sensitivity are combined into an aggregate sensitivity to be used to drive the statistical optimization.

An arc is defined as one circuit path through a cell. For a given arc, equation (11) defines the aggregate sensitivity. If an arc belongs to more than one path, the criticality is properly added for all the paths as defined in equation (10).

If a path/gate has a large spread, namely a large sensitivity, the path/gate does not need to be optimized for robustness if it is not a critical path or gate. On the contrary, if a gate has a small sensitivity but it belongs to a large number of critical paths, then optimization is performed on the gate. The aggregate sensitivity provides both the information for criticality and sensitivity and is used to drive optimization.

FIG. 13 reports the statistical timing report for the circuit illustrated in FIG. 9. The values annotated inside each gate are the delay D and the sensitivity S, respectively, for that gate. Note that the path from i3 to output o has the largest standard deviation (and sensitivity) among all the paths, but its criticality measure is zero.

Given this information, the aggregate sensitivity metric can be calculated for each gate in the circuit according to Equation 11. The values for the circuit in FIG. 13 are shown in FIG. 14. Traditionally, gates would be listed for optimization according to their worst negative slack. With the new metrics available from the SSTA engine 202, gates can be analyzed according to their aggregate sensitivity value. Cells with a high aggregate sensitivity may have a higher priority for optimization. For the example of FIG. 12, the cell G4 is optimized first because all of the critical paths in the design pass through that cell have a non-negligible sensitivity.

The system and method described herein provide circuit modeling and simulation that eliminates dominated paths and handles correlated paths.

Upon reading this disclosure, those of skill in the art will appreciate still additional alternative structural and functional designs for a system and a process for determining sensitivities of cells and gates and determining critical paths in circuits through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of determining timing characteristics of an electrical element, the method comprising:
   determining sensitivity of the electrical element in response to a number of process parameters representing process variation wherein the determining the sensitivity of the electrical element includes determining for the number of process parameters correlations between process parameters and determining statistical variations of the process parameters;

determining criticality of a plurality of paths to the electrical element, the criticality of a path in the plurality of paths including a probability distribution for negative slack; and calculating an aggregate sensitivity of the electrical element in response to the sensitivity of the electric element and the criticality of one or more paths in the plurality of paths, wherein calculating the aggregate sensitivity of the electrical element includes summing the sensitivity of the electrical element and the criticality of the one or more paths in the plurality of paths to the electrical element.

2. The method of claim 1 further comprising optimizing one or more gates to minimize slack based on the aggregate sensitivity of the electrical element.

3. The method of claim 1 wherein the determining the sensitivity of the electrical element includes determining the sensitivity of an arc to the process parameters.

4. The method of claim 1 wherein determining the sensitivity of the electrical element includes determining $$\gamma_k = \sqrt{\sum_{i=1}^{M} C_i^2 \sigma_i^2 + 2 \cdot \sum_{i=1}^{M} \sum_{j=i+1}^{M} \rho_{ij} C_i C_j \sigma_i \sigma_j}$$

where M is the number of process parameters, $C_i$ is the sensitivity of an arc k to process parameter i in the number of process parameters, $\rho_{ij}$ is the correlation between the process parameter i and process parameter j, and $\sigma_i$ is the standard deviation of process parameter i;

wherein calculating the aggregate sensitivity of the electrical element includes calculating an aggregate sensitivity $A_G$ for electrical element G by $$A_G = \sum_{k=1}^{N} \pi_k \gamma_k$$

where N is the number of paths through electrical element G, and $\pi_k$ is the criticality of path k.

5. A system for analyzing an electrical circuit comprising a plurality of electrical elements, the system comprising:

a processor for executing programs; and a circuit analyzer executable by the processor, the circuit analyzer including:

instructions for determining sensitivity of the electrical element in response to a number of process parameters representing process variation wherein the instructions for determining the sensitivity of the electrical element include instructions for determining for the number of process parameters correlations between process parameters and instructions for determining statistical variations of the process parameters;

instructions for determining criticality of a plurality of paths to the electrical element, the criticality of a path in the plurality of paths including a probability distribution for negative slack; and instructions for calculating an aggregate sensitivity of the electrical element in response to the sensitivity of the electrical element and the criticality of the plurality of paths, wherein the instructions for calculating the aggregate sensitivity of the electrical element include instructions for summing the sensitivity of the electrical element and the criticality of the one or more paths in the plurality of paths to the electrical element.

6. The system of claim 5 further comprising instructions for optimizing one or more gates to minimize slack based on the aggregate sensitivity.

7. The system of claim 5 wherein the instructions for determining the sensitivity of the electrical element includes instructions for determining the sensitivity of an arc to the process parameters.

8. The system of claim 5 wherein the instructions for determining the sensitivity of the electrical element includes instructions for determining $$\gamma_k = \sqrt{\sum_{i=1}^{M} C_i^2 \sigma_i^2 + 2 \cdot \sum_{i=1}^{M} \sum_{j=i+1}^{M} \rho_{ij} C_i C_j \sigma_i \sigma_j}$$

where M is the number of process parameters, $C_i$ is the sensitivity of an arc k to process parameter i in the number of process parameters, $\rho_{ij}$ is the correlation between process parameter i and process parameter j, and $\sigma_i$ is the standard deviation of process parameter i;

wherein the instructions for calculating the aggregate sensitivity of the electrical element includes instructions for calculating an aggregate sensitivity $A_G$ for electrical element G by $$A_G = \sum_{k=1}^{N} \pi_k \gamma_k$$

where N is the number of paths through electrical element G, and $\pi_k$ is the criticality of path k.

9. A computer program product for use in conjunction with a computer system, the computer program product comprising a computer readable storage medium and a computer program mechanism embedded therein, the computer program mechanism including:

instructions for determining sensitivity of the electrical element in response to a number of process parameters representing process variation wherein the instructions for determining the sensitivity of the electrical element include instructions for determining for the number of process parameters correlations between process parameters and instructions for determining statistical variations of the process parameters;

instructions for determining criticality of a plurality of paths to the electrical element, the criticality of a path in the plurality of paths including a probability distribution for negative slack; and instructions for calculating an aggregate sensitivity of the electrical element in response to the sensitivity of the electrical element and the criticality of one or more paths in the plurality of paths, wherein the instructions for calculating the aggregate sensitivity of the electrical element include instructions for summing the sensitivity of the electrical element and the criticality of the one or more paths in the plurality of paths to the electrical element.

10. The computer program product of claim 9 further comprising instructions for optimizing one or more gates to minimize slack based on the aggregate sensitivity.

11. The computer program product of claim 9 wherein the instructions for determining the sensitivity of the electrical element includes instructions for determining the sensitivity of an arc to the process parameters.

12. The computer program product of claim 9 wherein the instructions for determining the sensitivity of the electrical element includes instructions for determining $$\gamma_k = \sqrt{\sum_{i=1}^{M} C_i^2 \sigma_i^2 + 2 \cdot \sum_{i=1}^{M} \sum_{j=i+1}^{M} \rho_{ij} C_i C_j \sigma_i \sigma_j}$$

where M is the number of process parameters, $C_i$ is the sensitivity of an arc k to process parameter i in the number of process parameters, $\rho_{ij}$ is the correlation between process parameter i and process parameter j, and $\sigma_i$ is the standard deviation of process parameter i;

wherein the instructions for calculating the aggregate sensitivity of the electrical element includes instructions for calculating an aggregate sensitivity $A_G$ for electrical element G by $$A_G = \sum_{k=1}^{N} \pi_k \gamma_k$$

where N is the number of paths through electrical element G, and $\pi_k$ is the criticality of path k.

* * * * *